United States Patent [19]

Olson

[11] Patent Number: 4,486,678
[45] Date of Patent: Dec. 4, 1984

[54] ROTOR FOR A PERMANENT MAGNET GENERATOR

[75] Inventor: Raymond N. Olson, Rockford, Ill.

[73] Assignee: Sundstrand Corporation, Rockford, Ill.

[21] Appl. No.: 529,473

[22] Filed: Sep. 6, 1983

[51] Int. Cl.³ .............................................. H02K 21/12
[52] U.S. Cl. ..................................... 310/156; 310/261; 310/265
[58] Field of Search ........................ 310/156, 261, 265

[56] References Cited

U.S. PATENT DOCUMENTS

| | | |
|---|---|---|
| 761,682 | 1/1904 | Javaux et al. |
| 2,713,128 | 7/1955 | Toffolo ........................... 310/156 X |
| 3,169,203 | 2/1965 | Lavin et al. ........................ 310/156 |
| 3,531,670 | 9/1970 | Loudon ............................... 310/156 |
| 4,260,921 | 4/1981 | Silver ................................. 310/156 |
| 4,302,693 | 11/1981 | Burgmeier .......................... 310/156 |

Primary Examiner—Mark O. Budd
Attorney, Agent, or Firm—Wood, Dalton, Phillips, Mason & Rowe

[57] ABSTRACT

A rotor for a permanent magnet generator has a carrier of nonmagnetic material. One or more elements of magnetic material are carried by the carrier and provide a magnetic path in parallel with the primary magnetic path for operating flux which is coupled with the stator windings. The number of magnetic elements used determines the amount of flux diverted from the stator and thus adjusts the voltage generated in the stator winding.

14 Claims, 2 Drawing Figures

ROTOR FOR A PERMANENT MAGNET GENERATOR

FIELD OF USE

This invention relates to a permanent magnet generator and more particularly to a rotor construction for such a generator in which magnetic leakage in the rotor may be adjusted to adjust the operating voltage of the generator.

BACKGROUND OF THE INVENTION

The operating voltage of a permanent magnet generator is a function of the coercive force of the magnets. The coercive force tolerance of magnets is typically greater than the acceptable voltage tolerance for the generator. With some magnetic materials it is possible to demagnetize the magnets partially, thereby adjusting the generator voltage. However, with some materials, as samarium cobalt, for example, partial demagnetization is not possible.

It is also known to adjust the reluctance of a magnetic leakage path in the stator, reducing the generator operating flux and the generated voltage. This approach, however, does not permit an interchange of rotors from one stator to another. Readjustment is required if the rotor is replaced.

SUMMARY OF THE INVENTION

A principal feature of the invention is that the rotor of a permanent magnet generator has a carrier of nonmagnetic material with an element of magnetic material carried by the carrier to establish a magnetic path parallel with the external magnetic path coupled with the stator windings. The magnetic flux in the external path is reduced by the flux in the parallel path, reducing the generated voltage.

More particularly, the nonmagnetic carrier has holes therein which extend longitudinally of the rotor. Rods of magnetic material are inserted in one or more of the holes establishing the parallel path for leakage flux. The rods of magnetic material, or rods of a nonmagnetic material having the same density, are placed symmetrically in carrier holes to maintain balance of the rotor.

Another feature is that the rotor has a radial magnet construction with a plurality of uniformly spaced magnets which are radially magnetized. Nonmagnetic spacers are located between adjacent magnets.

A further feature is a tangential design with a plurality of spaced magnets that are magnetized peripherally. A carrier hub of nonmagnetic material is located radially inside the magnets, with longitudinal holes for magnetic rods radially aligned with the magnets.

Further features of the invention will readily be apparent from the following specification and from the drawings.

The drawings illustrate diagrammatically radial and tangential permanent magnet generators with provision for adjusting leakage flux through a path in the rotor, in accordance with the invention. Details of the stator windings, the rotor shaft bearings and the rotor drive are not shown.

Figure 1:
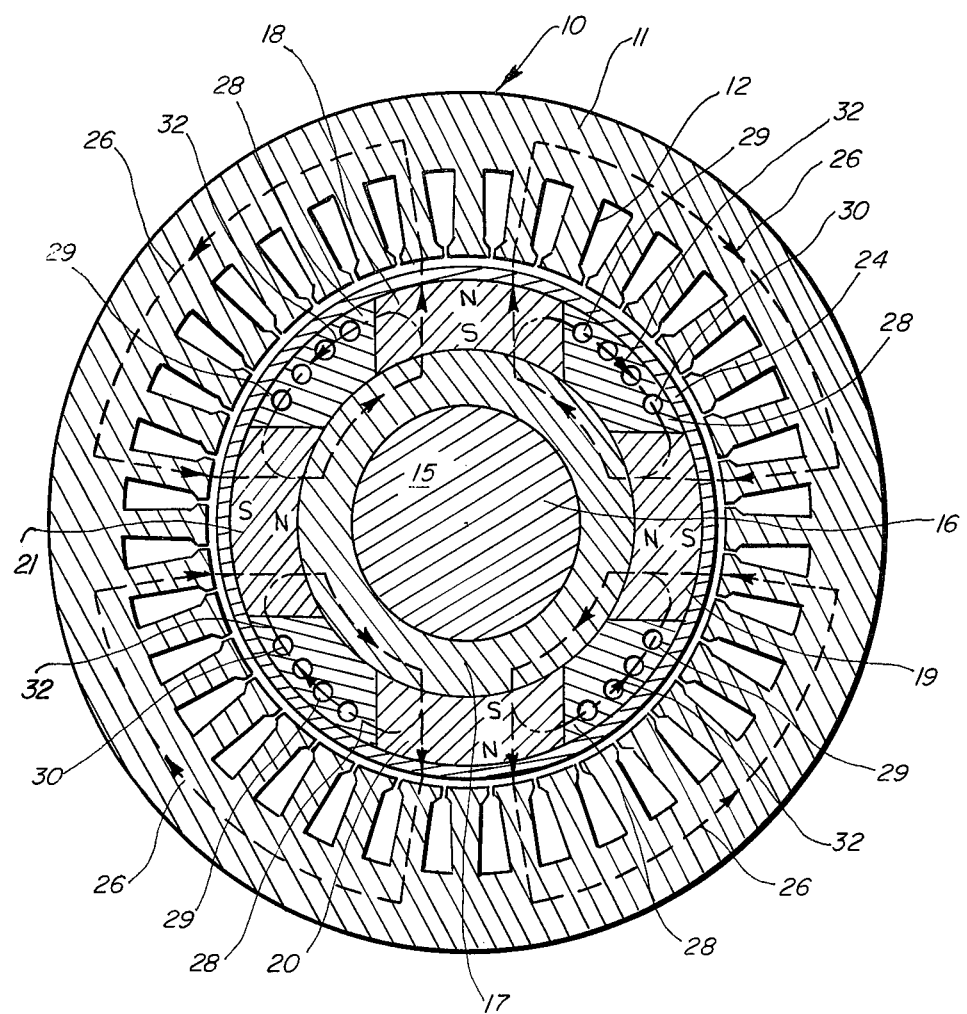
FIG. 1 is a transverse section through a permanent magnet generator with a radial magnet design.

In FIG. 1 the generator stator 10 is made up of ring-like laminations 11 of a suitable magnetic material. Slots 12 extend longitudinally around the inner periphery of the stator laminations and contain the windings in which a voltage is induced.

The rotor 15 includes a shaft 16 which is rotatably journaled in bearings and is driven by a prime mover. A hub 17 on the shaft 16 has four magnets 18, 19, 20 and 21 mounted thereon and spaced uniformly around the rotor. The polarity of adjacent magnets is reversed as indicated. Hub 17 is of a magnetic material and forms an inner yoke for the magnets. A cylindrical retaining ring 24, of nonmagnetic material, encircles the rotor.

The magnets set up flux in a plurality of primary paths through the stator, as indicated by the dashed lines 26. This flux links the windings in slots 12. When the rotor is driven, the flux in the primary paths cuts across the windings and an output voltage is generated.

If the coercive force of one or more of the permanent magnets is excessive, the output voltage of the generator will be too high. In accordance with the invention, the rotor is provided with spacers 28 between adjacent magnets and held in place on the rotor by the retaining ring 24. The spacers 28 are of a nonmagnetic material, as aluminum for example, and serve as carriers for magnetic element. Each of the spacers has formed therein a plurality of longitudinally extending holes 29. Rod-like elements 30 of a magnetic material are inserted in selected holes 29 establishing a flux path indicated by the dashed and dotted line 32 parallel with the external flux path 26, thus reducing the magnetic field in the external path and the voltage induced in the stator windings. The number of rods used, and their location, depend on the strength of the magnets and the amount of voltage reduction which is desired. If the magnets are matched, the rods of magnetic material will be symmetrically located on the rotor and the rotor balanced. If the magnets are not matched, the number and location of the rods 30 of magnetic material may not be symmetric. In this event additional rods of a nonmagnetic material having a mass substantially the same as the mass of the rods of magnetic material are inserted in appropriate holes to balance the rotor.

Figure 2:
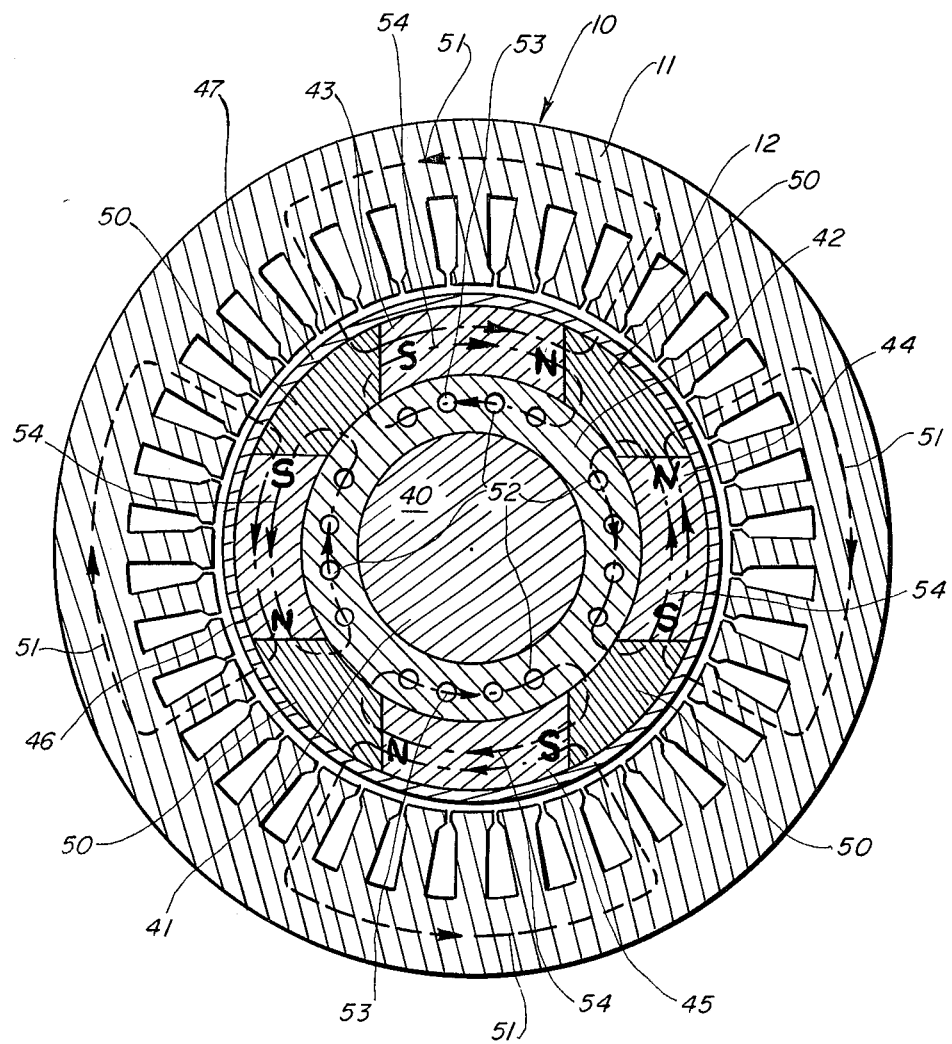
FIG. 2 is a transverse section through a permanent magnet generator with a tangential magnet design.

FIG. 2 illustrates the invention as incorporated in a permanent magnet generator with a tangential magnet configuration. The stator of the generator of FIG. 2 may be identical with the stator of FIG. 1. Common elements are identified with the same reference numeral and will not be described in detail. The rotor 40 has a shaft 41 on which is mounted a hub 42 of nonmagnetic material. Four spaced magnets 43, 44, 45 and 46 on the hub are surrounded by retaining ring 47. The magnets are magnetized peripherally and the polarity of adjacent magnets is reversed as indicated. Spacers 50 between adjacent magnets are of a magnetic material and serve as pole pieces for the rotor. The operating flux path which links windings in the slots of the stator is indicated by the dashed lines 51.

The hub of nonmagnetic material has longitudinally extending holes 52 aligned radially with each of the magnets. The flux of the magnetic field in the stator is reduced by inserting rods 53 of magnetic material in appropriate holes 52 of the carrier. The rods of magnetic material establish a magnetic path indicated by the dotted and dashed lines 54 through the pole pieces 50 and the hub 42, in parallel with the operating flux path 51 in the stator. As discussed above in connection with the radial magnet configuration, if the magnets 43, 44, 45 and 46 are matched, the rods of magnetic material 53 in the carrier 42 will be symmetrically located and the rotor balanced. If the magnets are not matched, symmetry is achieved by placing rods of a nonmagnetic material in appropriate holes of the carrier 42.

The rotor flux is preferably adjusted by placing the rotor, without any rods in the carriers, in a simulated stator test fixture. The magnetic flux from each of the pole pieces in the tangential configuration, is measured. By comparing the measured flux with that which is required for the desired voltage output, the excess flux is determined. An appropriate number of rods of magnetic material is inserted to reduce the flux to the desired level. If this results in a symmetrical arrangement of magnetic rods, the rotor adjustment is completed. If there is a lack of symmetry, additional rods of a nonmagnetic material are inserted in carrier holes as appropriate to achieve symmetry.

Generator rotors adjusted in this manner may be interchanged and the desired generator voltage will be achieved without readjustment of the rotors.

I claim:

1. A rotor for a permanent magnet generator comprising:
   a permanent magnet establishing a magnetic field in a path external to the rotor for coupling with stator windings to induce a voltage therein;
   a carrier of nonmagnetic material on said rotor; and
   an element of magnetic material carried by said carrier, establishing a magnetic path parallel with said external path to reduce the magnetic field in the external path and reduce the voltage induced in said stator windings.

2. The permanent magnet generator rotor of claim 1 having multiple magnets, multiple magnetic field paths external to the rotor and multiple magnetic paths parallel with said external paths.

3. The permanent magnet generator rotor of claim 1 in which said carrier has a hole therein extending longitudinally of the rotor and the magnetic material element is a rod located in said hole.

4. The permanent magnet generator rotor of claim 3 in which plural rods are symmetrically located on said rotor.

5. The permanent magnet generator rotor of claim 1 with a radial magnet construction having a plurality of magnets spaced uniformly about the rotor, each magnet being magnetized in a radial direction, a plurality of carriers of nonmagnetic material one between each set of adjacent magnets, an element of magnetic material being carried by at least one of said carriers.

6. The permanent magnet generator rotor of claim 5 having plural elements of magnetic material symmetrically carried on the rotor by a plurality of said carriers.

7. The permanent magnet generator rotor of claim 1 with a tangential magnet construction, having a plurality of magnets spaced uniformly about the rotor, each being magnetized in a peripheral direction, magnetic pole pieces being adjacent magnets, and a carrier hub of nonmagnetic material radially inside the magnets.

8. The permanent magnet generator rotor of claim 7 having plural elements of magnetic material symmetrically arranged on said carrier hub.

9. The permanent magnet generator rotor of claim 7 in which the element of magnetic material is radially aligned with one of said magnets.

10. The permanent magnet generator rotor of claim 9 in which a plurality of longitudinally extending holes are formed in the carrier hub, there being at least one hole aligned with each magnet, to receive an element of magnetic material.

11. A rotor for a permanent magnet generator, comprising:
    a shaft;
    a hub on said shaft;
    a plurality of permanent magnets on said hub establishing a magnetic field in paths external to the rotor for coupling with stator windings to induce a voltage therein;
    a peripheral retainer extending around said magnets;
    spacers between adjacent magnets, one of the hub or the spacers being a carrier of nonmagnetic material; and
    at least one element of magnetic material carried by said carrier to establish a magnetic path parallel with said external path to reduce the magnetic field in the external path and reduce the voltage induced in said stator windings.

12. The permanent magnet generator rotor of claim 11 in which said carrier has a hole therein extending longitudinally of the rotor and the element of magnetic material is a rod in said hole.

13. The permanent magnet generator rotor of claim 11 with a radial magnet construction, each of the magnets being magnetized in a radial direction, the spacers between the magnets being carriers of nonmagnetic material and the hub being a yoke of magnetic material.

14. The permanent magnet generator rotor of claim 11 with a tangential magnet construction, each of said magnets being magnetized in a peripheral direction, the spacers between adjacent magnets being of magnetic material and forming pole pieces and the hub being the carrier of nonmagnetic material.

* * * * *